United States Patent [19]

van der Zwart

[11] Patent Number: 4,514,795

[45] Date of Patent: Apr. 30, 1985

[54] HIGH-VOLTAGE GENERATOR, NOTABLY FOR AN X-RAY TUBE

[75] Inventor: Alfred J. van der Zwart, Norderstedt, Fed. Rep. of Germany

[73] Assignee: U.S. Philips Corporation, New York, N.Y.

[21] Appl. No.: 495,189

[22] Filed: May 16, 1983

[30] Foreign Application Priority Data

May 17, 1982 [DE] Fed. Rep. of Germany ....... 3218535

[51] Int. Cl.[3] ........................................ H02M 3/315

[52] U.S. Cl. ........................................ 363/27; 363/71; 363/139; 378/101; 378/105

[58] Field of Search .................... 363/65, 71, 133-136, 363/139, 96, 24-28; 378/101, 103-106, 109-112

[56] References Cited

U.S. PATENT DOCUMENTS 3,373,338 3/1968 Corey et al. .......................... 363/71

3,409,818 11/1968 Gillett .................................. 363/71

3,893,015 7/1975 Weil .................................. 363/71 X

FOREIGN PATENT DOCUMENTS 0694959 10/1979 U.S.S.R. ............................. 363/136

*Primary Examiner*—Peter S. Wong

*Attorney, Agent, or Firm*—Paul R. Miller

[57] ABSTRACT

The invention relates to a high-voltage generator for supplying two different output voltages or output currents, particularly for X-ray tubes whose anode current deviates from the cathode current. Symmetrical output voltages can be obtained during operation of this device, despite asymmetrical loads to the anode and cathode, by using a resonant direct current/alternating current converter with a capacitor circuit which is discharged through two different primary windings. The discharge through one primary winding takes place with a preferably adjustable delay with respect to discharge through the other primary winding.

6 Claims, 3 Drawing Figures

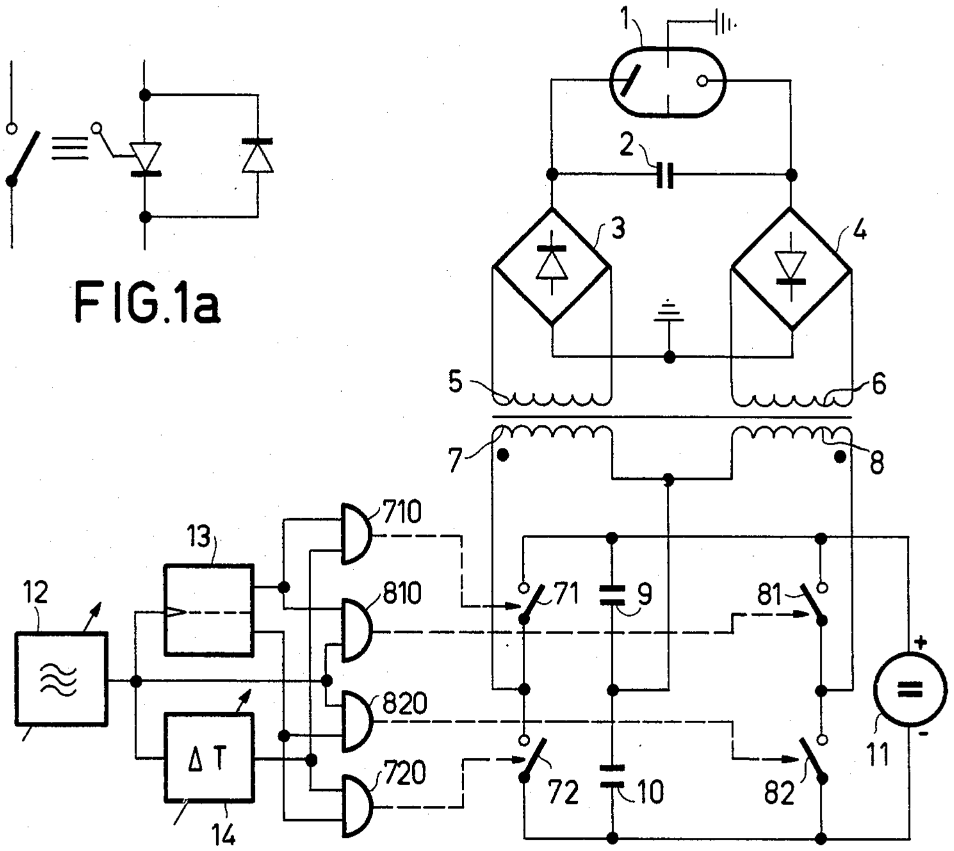
FIG.1a
FIG.1
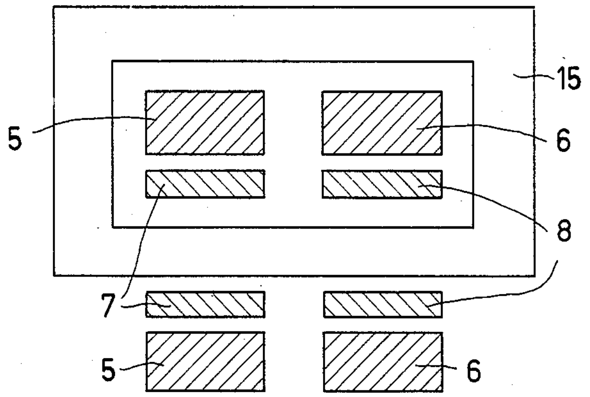
FIG.2

HIGH-VOLTAGE GENERATOR, NOTABLY FOR AN X-RAY TUBE

The invention relates to a high-voltage generator, notably for an X-ray tube, comprising a resonant direct current/alternating current converter in which charge transfer currents from a capacitor device are made to flow alternately in two primary windings of a high-voltage transformer device by means of switches.

A high-voltage generator of this kind forms the subject of the previous German Application P 30 46 413.2 (FIG. 2*b*). Therein, the currents through the two primary windings are equal. When the transformer device is symmetrically constructed, the positive and negative potentials on the output of the high-voltage generator which are generated by means of the rectifier circuits connected thereto are nominally equal. They remain equal also when the two potentials are applied to a cathode and an anode of an X-ray tube whose anode current corresponds to the cathode current when the high-voltage decreases due to the comparatively high internal resistance of the high-voltage generator.

Nowadays, however, there are X-ray tubes whose cathode current deviates or differs from the anode current, because a part of the current through the cathode flows off via the grounded metal envelope. When such an X-ray tube is connected to such a high-voltage generator, an asymmetrical load arises and, in spite of the symmetrical distribution of the no-load voltage, an asymmetrical distribution of the anode voltage and the cathode voltage exists so that, for example, the anode voltage amounts to +60 kV and the cathode voltage to −40 kV (with respect to ground).

Therefore, the application P 30 43 632.9 discloses a high-voltage generator which comprises two direct current/alternating current converters which can be independently controlled in order to enable fast adjustment of the anode voltage and the cathode voltage with respect to one another, as well as of their sum in accordance with the relevant requirements. The variation of the voltages generated by both direct current/alternating current converters is achieved by variation of the switching frequency at which the switches included in the direct current/altering current converters are switched on and off. However, these different operating frequencies of the two direct current/alternating current converters cause a comparatively large superposed high-voltage ripple due to beats.

It is the object of the invention to construct a high-voltage generator of the kind set forth so that both resonant direct current/alternating current converters included therein always operate with the same frequency and nevertheless generate different voltages or different powers.

This object in accordance with the invention is achieved in that a capacitor device is constructed so that it conducts the currents through each of two primary windings, there being provided a preferably controllable delay device for adjustable delay of the switching pulses for the switches so that the currents through the primary windings start to flow at different instant of time.

The invention is based on the recognition of the fact that in a resonant direct current/alternating current converter the amplitude of the current through the primary winding connected thereto is dependent on the energy stored in the capacitor device at the instant at which the flow through one of the primary windings commences (because the associated switch is closed). When the switch for one primary winding is closed after a given delay with respect to the switch for the other primary winding, a smaller current pulse will flow through the one primary winding than through the other primary winding, so that the energy transferred via the one primary winding is also smaller. The longer the delay, the greater the difference will be. The switching frequency, however, is the same for both direct current/alternating current converters (the switching pulses are only shifted in time with respect to one another), so that no superposed ripple is produced. Moreover, the high-voltage generator in accordance with the invention requires hardly any additional materials, because only one capacitor device is required.

The transformer device could in principle consist of two separate transformers, each having an iron core. The transformer device in a further preferred embodiment in accordance with the invention, however, comprises two primary windings which are wound on the same core and which are connected in series with an opposed winding direction. Thus, only one iron core is required.

In its simplest form, the capacitor device consists of only a single capacitor having one connection connected to ground while the other connection is connected to the junction of the two primary winding with each of the other connections being connected to a positive and a negative direct voltage via two switches which can be push-pull controlled. The positive and the negative direct voltage can be generated by means of a rectifier which comprises two series-connected electrolytic capacitors whose junction is connected to ground. This embodiment, however, has several drawbacks. These drawbacks are eliminated in a preferred embodiment in accordance with the invention in that the capacitor device comprises two series-connected capacitors with two series connections each consisting of two switches which can be switched in push-pull, and a direct voltage source being connected parallel to the series connection, and the primary windings being connected between the junctions of each time a series connection consisting of two switches on the one side and the junction of the two capacitors on the other side.

The invention will be described in detail hereinafter with reference to the drawing.

FIG. 1 shows a block diagram of a high-voltage generator in accordance with the invention.

FIG. 1*a* shows the technical implementation of the switches of FIG. 1, and

FIG. 2 shows a suitable high-voltage transformer device.

The reference numeral 1 in FIG. 1 denotes an X-ray tube comprising a grounded metal envelope with its anode being connected to a positive high voltage while the cathode is connected to a negative high voltage (with respect to ground). The current emitted by the cathode flows partly via the anode, but also partly via the metal envelope. Consequently, in an X-ray tube of this kind the cathode current is larger than the anode current. A smoothing capacitor 2 is connected parallel to the X-ray tube 1. Moreover, the anode is connected to the positive output of a first rectifier bridge 3 and the cathode is connected to the negative output of a second rectifier bridge 4. The other outputs of the rectifier bridges 3 and 4 are connected to ground. The alternating voltage inputs of the rectifier bridges 3 and 4 are connected to secondary windings 5 and 6, respectively, which are magnetically coupled to primary windings 7 and 8, respectively.

The two primary windings 7 and 8 are interconnected and their junction is connected to the junction of two equally large capacitors 9 and 10. Parallel to the series connection of these two capacitors there is connected a direct voltage source 11 and a first series connection of two electronic switches 71, 72 and a second series connection of two electronic switches 81 and 82. The connection of the primary winding 7 which is not connected to the primary winding 8 is connected to the junction of the two switches 71 and 72, the corresponding connection of the primary winding 8 being connected to the junction of the two switches 81 and 82.

As appears from FIG. 1*a*, each switch comprises a thyristor whereto a diode is connected in parallel in the reverse direction. The thyristors in the series-connected switches 71 and 72, 81 and 82 have the same forward direction so that the anodes of the thyristors are connected to the positive pole of the direct voltage source 11 and the cathodes of the thyristors are connected to the negative pole of the direct voltage source 11.

Each of the primary windings 7, 8 forms, in conjunction with the associated switches 71, 72 and 81, 82, respectively, and the capacitors 9 and 10, a resonant direct current/alternating current converter in which the switches 71 and 72 are alternately opened and closed. For example, when the switch 71 is closed, a current flows through the winding 7; this current is distributed between the capacitors 9 and 10 and charges these capacitors in an opposite sense so that the overall voltage across the capacitors remains constant (during this operation the individual capacitor voltages may become higher than the voltages supplied by the direct voltage generator 11). After one half oscillation whose duration is dependent on the stray inductance of the primary winding 7 (the main inductance is substantially short-circuited by the load at the high-voltage side) and on the capacitance of the capacitors 9 and 10, the current passes through zero so that the thyristor in the switch 71 extinguishes; however, current continues to flow through the diode in the switch. The thyristor in the switch 72 is closed after extinguishing of the thyristor in the switch 71; a current then flows through the primary winding in a direction which opposes that of the current flowing there through during the first half oscillation with the current again being distributed between the two capacitors 9 and 10 so that the capacitors are charged in a opposite sense. At the end of this half oscillation, the thyristor in the switch 72 extinguishes, after which the switch 71 can be closed again etc.

Both direct current/alternating current converters of the circuit arrangement shown in FIG. 1 are simultaneously in operation, so that the capacitors 9 and 10 are each time charged in the same direction by the currents flowing through the primary windings 7 and 8.

However, if both switches 71 and 81 were simultaneously switched on, and subsequently also the switches 72 and 82, the no-load high voltages on the outputs of the rectifiers 3 and 4 would each time be equal. However, because the cathode current is larger than the anode current of the X-ray tube 1, the cathode voltage would be lower than the anode voltage; this is disadvantageous for the operation of such an X-ray tube. Therefore, the switch 71 is closed slightly later than the corresponding switch 81; subsequently, the switch 72 is closed slightly later than the switch 82.

The effect of this step can be explained in that in a resonant circuit whose elements are interconnected by the closing of a switch, the current oscillation produced by the inductance is larger as the capacitively stored energy is larger at the instant of the closing of the switch. At the instant at which the switch 71 is closed, part of the energy stored in the capacitors 9 and 10 has already been transferred to the primary winding 8; it follows therefrom that the current pulse in the primary winding 7 is smaller than that in the primary winding 8. Because the switching frequency is the same for both direct current/alternating current converters, however, the energy transferred via the primary winding 7 is less than the energy transferred via the primary winding 8. Consequently, the value of the no-load voltage on the output of the rectifier 4 (with respect to ground) becomes larger than that of the no-load voltage on the output 3. This difference is more pronounced as the delay between the closing of the switch 81 and the switch 71 or the switches 82 and 72, respectively, is longer. The delays may be chosen so that, when loaded by the X-ray tube 1, the anode voltage and the cathode voltage are equal; the delays may even be chosen to be so large that the cathode voltage becomes higher than the anode voltage; this may be advantageous in given circumstances.

The construction of the circuit for the control of the switches 71 through 82 is also shown in simplified form in FIG. 1. The switches 71, 72, 81 and 82 are controlled (in this sequence) by AND-gates 710, 720, 810 and 820 which supply, via pulse shapers (not shown), start pulses and (because the switches comprise thyristors) ignition pulses for the associated switches. The start or ignition pulses are supplied by a voltage-controlled squarewave oscillator 12 whose frequency amounts to twice the frequency of the start or ignition pulses. The output pulses of the oscillator 12 are applied to the input of a bistable flip-flop 13 which is switched over each time by a given edge, for example, the positive edge which could correspond to the 0-1 transition. One output of the bistable flip-flop 13 is connected to an input of the AND-gates 710 and 810, while the other, complementary output of the bistable flip-flop 13 is connected to an input of the AND-gates 720 and 820. Each of the output pulses of the oscillator 12, moreover, is applied to a further input of the AND-gates 810 and 820, the corresponding inputs of the AND-gates 710 and 720 being connected to the output of a preferably electronically controllable delay element 14 whose input is connected to the output of the oscillator 12.

Thanks to the control of the AND-gates by the bistable flip-flop 13, the frequency of the pulses on the output of the AND-gates amounts to only half the oscillator frequency. The pulses on the outputs of the circuits 810 and 820 are shifted through one half switching period with respect to one another, because each pulse is controlled by one of the complementary outputs of the bistable flip-flop. The same is applicable to the pulses of the AND-gates 710, 720; however, these pulses are shifted through at least their leading edge (0-1 transition) with respect to the pulses of the AND-gates 810 and 820 by the delay time introduced by the delay element 14, because these AND-gates are not directly connected to the output of the oscillator 12, but rather via the delay element 14. A variation of the oscillator frequency causes a variation of the voltage on the X-ray tube in the same sense. The values of the oscillator frequency and the delay time associated with different tube voltages and tube currents can be stored in a read-only memory for the control of the delay element and the oscillator.

FIG. 2 shows the high-voltage transformer. The two primary windings 7 and 8 are provided on a closed iron core 15 at some distance from one another, so that therebetween only a comparatively loose magnetic coupling exists. The associated secondary coils 5 and 6, respectively, are arranged thereon, so that the coupling between a primary winding, for example, the winding 8 and the other secondary winding (5) is only very weak. Thus, using only one iron core the advantages of two separate transformers comprising separate iron cores are substantially achieved. As can be deduced from FIG. 1, the primary windings 7 and 8 must be wound in opposite senses in order to prevent short-circuiting (for example, after the closing of the switches 71 and 81) of the direct voltage source by the parallel connection of the two windings, then having a very low reactance, and a capacitor (10). Even though the invention has been described with reference to an embodiment of a high-voltage generator for an X-ray tube, it is alternatively possible to connect thereto other users which require different positive and negative high voltage potentials or which load the corresponding connections to a different extent and which are coupled to the transformer device via a rectifier.

It may be desirable to delay the switching pulses for the switches 81 and 82 with respect to the switching pulses for the switches 71 and 72. In that case the delay circuit should be connected between the oscillator 12 and the inputs of the AND-gates 810 and 820 instead of between the oscillator 12 and the inputs of the AND-gates 710 and 720. If the anode voltage must be higher in given operating conditions of the high-voltage generator while the cathode voltage must be higher in other operating conditions, delay circuits whose delay can be controlled as desired must be provided in each of the two connections. However, use can alternatively be made of a switching device which each time activates the delay circuit in one of the two connections and which directly connects the other connection.

What is claimed is:

1. A high voltage generator for use with an X-ray tube comprising:

a resonant direct current/alternating current converter for alternative flow of charge transfer currents from a capacitor device through two primary windings of a high-voltage transformer by means of switches, wherein said capacitor device conducts said currents through each of said two primary windings of said transformer, and a controllable delay means for delaying switching pulses to said switches, so that currents through said primary windings start flowing at different time instants.

2. A high voltage generator according to claim 1, wherein said transformer comprises two primary windings wound on the same core, said two primary windings being wound in respective opposite senses, and said two primary windings being connected in series.

3. A high voltage generator according to claim 2, wherein said capacitor device comprises two series connected capacitors; two series connections, each of said series connections including two of said switches, said switches being switched in a push-pull configuration; and a direct voltage source connected in parallel to said two series connections; and wherein said primary windings are each connected between junctions of said series connections and junctions of said two capacitors.

4. A high voltage generator according to claim 3, wherein said delay means includes an oscillator applying output pulses to an input of a bistable flip-flop, a plurality of AND gates providing signals to said switches, said AND gates receiving one input from said bistable flip-flop, and a delay circuit receiving pulses from said oscillator and applying output signals to one set of said AND gates, said AND gates being paired to each of said series connections.

5. A high voltage generator according to claim 1, wherein said capacitor device comprises two series connected capacitors; two series connections, each of said series connections including two of said switches, said switches being switched in a push-pull configuration; and a direct voltage source connected in parallel to said two series connections; and wherein said primary windings are each connected between junctions of said series connections and junctions of said two capacitors.

6. A high voltage generator according to claim 5, wherein said delay means includes an oscillator applying output pulses to an input of a bistable flip-flop, a plurality of AND gates providing signals to said switches, said AND gates receiving one input from said bistable flip-flop, and a delay circuit receiving pulses from said oscillator and applying output signals to one set of said AND gates, said AND gates being paired to each of said series connections.

* * * * *